United States Patent
Metz

(10) Patent No.: US 7,142,948 B2
(45) Date of Patent: Nov. 28, 2006

(54) CONTROLLER INTERFACE WITH DYNAMIC SCHEDULE DISPLAY

(75) Inventor: Stephen V. Metz, St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 168 days.

(21) Appl. No.: 10/753,917

(22) Filed: Jan. 7, 2004

(65) Prior Publication Data

US 2005/0149233 A1 Jul. 7, 2005

(51) Int. Cl.
G05D 23/00 (2006.01)
G05B 13/00 (2006.01)

(52) U.S. Cl. .................... 700/276; 236/91 D; 236/94; 700/52

(58) Field of Classification Search ................ 700/83, 700/276, 17, 52; 236/91 R, 91 D, 94
See application file for complete search history.

(56) References Cited

U.S. PATENT DOCUMENTS

| | | | |
|---|---|---|---|
| 4,079,366 A | 3/1978 | Wong | |
| 4,174,807 A | 11/1979 | Smith et al. | |
| 4,206,872 A | 6/1980 | Levine | |
| 4,224,615 A | 9/1980 | Penz | |
| 4,264,034 A | 4/1981 | Hyltin et al. | |
| 4,298,946 A | 11/1981 | Hartsell et al. | |
| 4,308,991 A | 1/1982 | Peinetti et al. | |
| 4,337,822 A | 7/1982 | Hyltin et al. | |
| 4,382,544 A | 5/1983 | Stewart | |
| 4,386,649 A | 6/1983 | Hines et al. | |
| 4,388,692 A | 6/1983 | Jones et al. | |
| 4,431,134 A | 2/1984 | Hendricks et al. | |
| 4,442,972 A | 4/1984 | Sahay et al. | |
| 4,446,913 A | 5/1984 | Krocker | |
| 4,479,604 A | 10/1984 | Didner | |
| 4,506,827 A | 3/1985 | Jamieson et al. | |
| 4,606,401 A | 8/1986 | Levine et al. | |
| 4,621,336 A | 11/1986 | Brown | |
| 4,622,544 A | 11/1986 | Bially et al. | |
| 4,717,333 A | 1/1988 | Carignan | |
| 4,725,001 A | 2/1988 | Carney et al. | |
| 4,837,731 A | 6/1989 | Levine et al. | |
| 4,881,686 A | 11/1989 | Mehta | |
| 4,918,439 A | 4/1990 | Wozniak et al. | |
| 4,948,040 A | 8/1990 | Kobayashi et al. | |
| 4,992,779 A | 2/1991 | Sugino et al. | |
| 4,997,029 A | 3/1991 | Otsuka et al. | |
| 5,005,365 A | 4/1991 | Lynch | |

(Continued)

FOREIGN PATENT DOCUMENTS

DE 3334117.6 4/1985

(Continued)

OTHER PUBLICATIONS

Aprilaire Electronic Thermostats Models 8344, 8346, 8348, 8363, 8365, 8366 Operating Instructions, 8 pages, prior to filing date of present application.

(Continued)

Primary Examiner—Charles R. Kasenge

(57) ABSTRACT

A controller includes a programmable schedule and a user interface, adapted and configured to illustratively display at least a portion of the programmable schedule along a time axis and a current time indicator positioned to indicate the current time along the time axis. A method is also described including the steps of: operating a programmable controller having a scheduled current set point and a scheduled future set point; and providing a message indicating a time of the scheduled future set point change.

8 Claims, 6 Drawing Sheets

U.S. PATENT DOCUMENTS

| | | | |
|---|---|---|---|
| 5,012,973 A | 5/1991 | Dick et al. | |
| 5,038,851 A | 8/1991 | Metha | |
| 5,053,752 A | 10/1991 | Epstein et al. | |
| 5,065,813 A | 11/1991 | Berkeley et al. | |
| 5,086,385 A * | 2/1992 | Launey et al. | 700/83 |
| 5,088,645 A | 2/1992 | Bell | |
| 5,140,310 A | 8/1992 | DeLuca et al. | |
| 5,161,606 A | 11/1992 | Berkeley et al. | |
| 5,170,935 A | 12/1992 | Federspiel et al. | |
| 5,181,653 A | 1/1993 | Foster et al. | |
| 5,230,482 A | 7/1993 | Ratz et al. | |
| 5,238,184 A | 8/1993 | Adams | |
| 5,251,813 A | 10/1993 | Kniepkamp | |
| 5,259,445 A | 11/1993 | Pratt et al. | |
| 5,329,991 A | 7/1994 | Metha et al. | |
| 5,348,078 A | 9/1994 | Dushane et al. | |
| 5,386,577 A | 1/1995 | Zenda | |
| 5,482,209 A | 1/1996 | Cochran et al. | |
| 5,526,422 A | 6/1996 | Keen | |
| 5,537,106 A | 7/1996 | Mitcuhashi | |
| 5,566,879 A | 10/1996 | Longtin | |
| 5,570,837 A | 11/1996 | Brown et al. | |
| 5,673,850 A | 10/1997 | Uptegraph | |
| 5,782,296 A | 7/1998 | Metha | |
| 5,818,428 A | 10/1998 | Eisenbrandt et al. | |
| 5,873,519 A | 2/1999 | Beilfuss | |
| 5,886,697 A | 3/1999 | Naughton et al. | |
| 5,901,183 A | 5/1999 | D'Souza | |
| 5,902,183 A | 5/1999 | D'Souza | |
| 5,937,942 A | 8/1999 | Bias et al. | |
| 5,947,372 A | 9/1999 | Tiernan | |
| 6,020,881 A | 2/2000 | Naughton et al. | |
| 6,032,867 A | 3/2000 | Dushane et al. | |
| 6,059,195 A | 5/2000 | Adams et al. | |
| 6,081,197 A | 6/2000 | Garrick et al. | |
| 6,121,875 A | 9/2000 | Hamm et al. | |
| 6,140,987 A | 10/2000 | Stein et al. | |
| 6,192,282 B1 | 2/2001 | Smith et al. | |
| 6,196,467 B1 | 3/2001 | Dushane et al. | |
| 6,208,331 B1 | 3/2001 | Singh et al. | |
| 6,236,326 B1 | 5/2001 | Murphy | |
| 6,285,912 B1 | 9/2001 | Ellison et al. | |
| 6,290,140 B1 | 9/2001 | Pesko et al. | |
| 6,315,211 B1 | 11/2001 | Sartain et al. | |
| 6,318,639 B1 | 11/2001 | Toth | |
| 6,330,806 B1 | 12/2001 | Beaverson et al. | |
| 6,344,861 B1 | 2/2002 | Naughton et al. | |
| 6,351,693 B1 | 2/2002 | Monie et al. | |
| 6,398,118 B1 | 6/2002 | Rosen et al. | |
| 6,478,233 B1 | 11/2002 | Shah | |
| 6,502,758 B1 | 1/2003 | Cottrell | |
| 6,518,957 B1 | 2/2003 | Lehtinen et al. | |
| 6,578,770 B1 | 6/2003 | Rosen | |
| 6,580,950 B1 | 6/2003 | Johnson et al. | |
| 6,581,846 B1 | 6/2003 | Rosen | |
| 6,595,430 B1 | 7/2003 | Shah | |
| 6,619,555 B1 | 9/2003 | Rosen | |
| 6,621,507 B1 | 9/2003 | Shah | |
| 6,786,421 B1 | 9/2004 | Rosen | |
| 2001/0029585 A1 | 10/2001 | Simon et al. | |
| 2001/0042624 A1 | 11/2001 | Essalik et al. | |
| 2001/0052459 A1 | 12/2001 | Essalik et al. | |
| 2002/0005435 A1 | 1/2002 | Cottrell | |
| 2002/0092779 A1 | 7/2002 | Essalik et al. | |
| 2003/0034897 A1 | 2/2003 | Shamoon et al. | |
| 2003/0034898 A1 | 2/2003 | Shamoon et al. | |
| 2003/0121652 A1 | 7/2003 | Carey et al. | |
| 2003/0123224 A1 | 7/2003 | LaCroix et al. | |
| 2003/0142121 A1 | 7/2003 | Rosen | |
| 2003/0150926 A1 | 8/2003 | Rosen | |
| 2003/0150927 A1 | 8/2003 | Rosen | |
| 2004/0074978 A1 | 4/2004 | Rosen | |
| 2004/0262410 A1* | 12/2004 | Hull | 236/91 R |

FOREIGN PATENT DOCUMENTS

| | | |
|---|---|---|
| EP | 0678204 | 3/2000 |
| EP | 0985994 | 3/2000 |
| EP | 09859940 | 3/2000 |
| EP | 1074009 | 2/2001 |
| EP | 1074009 | 7/2001 |
| WO | WO 97/11448 | 3/1997 |
| WO | WO 97/3939 | 10/1997 |
| WO | WO 97/39392 | 10/1997 |
| WO | WO 01/52515 | 7/2001 |
| WO | WO 01/79952 | 10/2001 |

OTHER PUBLICATIONS

Aube Technologies, Electronic Thermostat for Heating System Model TH135-01, 5 pages, Aug. 14, 2001.
Aube Technologies, TH140-28 Electronic Thermostat, Installation Instructions and User Guide, pp. 1-4, Jan. 22, 2004.
Braeburn Model 3000 Owner's Manual, pp. 1-13, 2001.
Braeburn Model 5000 Owner's Manual, pp. 1-17, 2001.
BRK First Alert, User's Manual, Smoke and Fire Alarms, pp. 1-7, Nov. 2002.
BRK Electronics Maximum Protection Plus Ultimate Convenience Smoke Alarm, 24 pages, prior to filing date of present application.
Carrier Microelectronic Programmable Thermostat Owner's Manual, pp. 1-24, May 1994.
Carrier TSTATCCRF01 Programmable Digital Thermostat, pp. 1-21, prior to filing date of present application.
Danfoss RT51/51RF & RT52/52RF User Instructions, 2 pages, Jun. 2004.
Firex Smoke Alarm, Ionization Models AD, ADC Photoelectric Model Pad, 4 pages, prior to filing date of present application.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electric Programmable Thermostats, Installation Instructions, pp. 1-8, 2003.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, MagicStat® CT3200 Programmable Thermostat, Installation and Programming Instructions, pp. 1-24, 2001.
Invensys Deluxe Programmable Thermostats 9700, 9701, 9715, 9720, User's Manual, 21 pages, prior to filing date of present application.
Lux TX9000 Installation, 3 pages, prior to filing date of present application.
Ritetemp Operation 8029, 3 pages, Jun. 19, 2002.
Ritetemp Operation 8050, 5 pages, Jun. 26, 2002.
Ritetemp Operation 8085, pp. 1-6, prior to filing date of present application.

Sealed Unit Parts Co., Inc., Supco & CTC Thermostats . . . loaded with features, designed for value!, 6 pages, prior to filing date of present application.
Totaline Model P474-1035 Owner's Manual Programmable 5-2 Day Digital Thermostat, pp. 1-21, prior to filing date of present application.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to filing date of present application.
White-Rogers 1F80-224 Programmable Electronic Digital Thermostat, Installation and Operation Instructions, 8 pages, prior to filing date of present application.
White-Rodgers Installation Instructions for Heating & Air Conditioning IF78 Non-Programmable Thermostat, 6 pages, prior to filing of present application.
White-Rodgers, Comfort-Set 90 Series Premium, 4 pages, prior to filing date of present application.
ADI, "Leopard User Manual," 93 pages, 2001.
Adicon 2500, "The Automator," 4 pages, Oct.-Dec. 2000.
ADT Security Service, "iCenter Advanced User Interface 8142ADT," Installation and Setup Guide, 5 pages, May 2001; First Sale Feb. 2001.
Business Wire, "MicroTouch Specialty Products Group to Capitalize on Growing Market for Low-Cost Digital Matrix Touchscreens," p. 1174 (2 pages), Jan. 6, 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
DeKoven et al., "Designing Collaboration in Consumer Products," 2 pages, 2001.
Freudenthal et al., "Communicating extensive smart home functionality to users of all ages: the design of a mixed-initiative multidodal thermostat-interface," pp. 34-39, Mar. 12-13, 2001.
Honeywell News Release, "Honeywell's New Sysnet Facilities Integration System For Boiler Plant and Combustion Safety Processes," 4 pages, Dec. 15, 1995.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
"Mark of Excellence Award Finalist Announced," http://64.233.167.104/search?Q=cache:ciOA2YtYaBIJ:www.hometoys.com/released/mar . . . , 6 pages, Leopard Touchscreen on page 2, dated prior to Mar. 4, 2000, printed Aug. 20, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Product Review—Philips Pronto Remote Control," http://hometheaterhifi.com/volume_6_2/philipsprontoremotecontrol.html, 5 pages, dated May 1999, printed Aug. 20, 2004.
"CorAccess Systems/In Home," http://web.archive.org/web20011212084427/www.coraccess.com/home.html, 1 page, copyright 2001, printed Aug. 19, 2004.
"A Full Range of Alternative User Interfaces For Building Occupants and Operators," http://www.automatedbuildings.com/news/jan00/articles/andover/andover.htm, 5 pages, dated Jan. 2000, printed Sep. 20, 2004.
http://www.cc.gatech.edu/computing/classes/cs6751_94_fall/groupc/climate-2/node1.html, "Contents," 53 pages, printed Sep. 20, 2004.
"HAI Company Background," http://www.homeauto.com/AboutHAI/abouthai_main.htm, 2 pages, printed Aug. 19, 2004.
Cardio, by Secant; http://www.hometoys.com/htinews/apr98/reviews/cardio.htm, "HTINews Review," Feb. 1998, 5 pages, printed Sep. 14, 2004.
Cardio Manual, available at http://www.secant.ca/En/Documentation/Cardio2ë-Manual.pdf, Cardio Home Automation Inc., 55 pages, printed Sep. 28, 2004.

Domotique Secant Home Automation—Web Page, available at http://www.secant.ca/En/Company/Default.asp, 1 page, printed Sep. 28, 2004.
"Vantage Expands Controls For Audio/Video, HVAC and Security," http://www.hometoys.com/htinews/aug99/releases/vantage03.htm, 2 pages, dated Aug. 3, 1999, printed Aug. 20, 2004.
Visor Handheld User Guide, Copyright 1999-2000.
"Home Toys Review—TouchLinc", http://www.hometoys.com/htinews/aug99/reviews/touchlinc/touchlinc.htm, 3 pages, dated Aug. 1999, printed Aug. 20, 2004.
"RC X10 Automation Forum: Control your Heating and Cooling System with Pronto(1/1)," http://www.remotecentral.com/cgi-bin/mboard/rc-x 10/thread.cgi?12, 2 pages, dated Apr. 23, 1999, printed Aug. 20, 2004.
Blake et al., "Seng 310 Final Project" Report, dated Apr. 6, 2001.
Blake et al., "Seng 310 Final Project Demo Program" Illustration, 3 pages, Apr. 6, 2001.
"Spotlight on integrated systems," Custom Builder, V8, N2, p. 66(6), Mar.-Apr. 1993.
AutomatedBuildings.com Article—"Thin Client" Solutions, "Pressure, Air Flow, Temperature, Humidity & Valves," Dwyer Instruments, Inc., 5 pages, printed Sep. 20, 2004.
ADT Security Services, "iCenter Advanced User Interface 8142ADT," Installation and Setup Guide, 5 pages, May 2001; First Sale Feb. 2001.
Cardio, by Secant; http://www.hometoys.com/htinews/apr98/reviews/cardio.htm, "HTINews Review," Feb. 1998, 5 pages, printed Sep. 14, 2004.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions, pp. 1-12, Aug. 1999.
CorAccess, "Companion 6," User Guide, pp. 1-20, Jun. 17, 2002.
http:/.www.ritetemp.info/rtMenu__13.html, Rite Temp 8082, 8 pages , printed Jun. 20, 2003.
http://www.thermostatsales.com, Robertshaw, "9610 Digital Progammable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
Hunter, "44200/44250," Owner's Manual, 32 pages, printed prior to filing date.
Hunter, "44300/44350," Owner's Manual, 35 pages, printed prior to filing date.
Hunter, "Auto Saver 550", Owner's Manual Model 44550, 44 pages, printed prior to filing date.
Invensys™ , "9700i 9701i 9715i 9720i Deluxe Programmable Thermostats," User's Manual, pp. 1-28, printed prior to filing date.
Lux, "ELVI Programmable Line Voltage Thermostat," Owner's Manual, 3 pages, printed prior to filing date.
Lux, "511 Series Smart Temp Electronic Thermostat," Owner's Manual, 3 pages, printed prior to filing date.
Lux, "600 Series Smart Temp Electronic Thermostat," Owner's Manual, 3 pages, printed prior to filing date.
Lux, "602 Series Multi-Stage Programmable Thermostat," Owner's Manual, 2 pages, printed prior to filing date.
Lux, "605/2110 Series Programmable Heat Pump Thermostat," Owner's Manual, 3 pages, printed prior to filing date.
Lux, "700/9000 Series Smart Temp Electronic Thermostat," Owner's Manual, 3 pages, printed prior to filing date.
Lux, "PSPH521 Series Programmable Heat Pump Thermostat," Owner's Manual, 3 pages, printed prior to filing date.
Lux, "TX1500 Series Smart Temp Electronic Thermostat," Owner's Manual, 6 pages, printed prior to filing date.
Lux, "TX500 Series Smart Temp Electronic Thermostat," Owner's Manual, 3 pages, printed prior to filing date.

METASYS, "HVAC Pro for Windows User's Manual," 308 pages, 1998.
Totaline, "1 For All programmable Digital Thermostat," Owner's Manual P/N P374-1100FM, 23 pages, Nov. 1998.
Totaline, "1 For All Programmable Digital Thermostat," Owner's Manual P/N P474-1050, 21 pages, Nov. 1998.
Totaline, "1 For All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Warmly Yours, "Model TH111GFCI-P (120 VAC)," Manual, pp. 1-4, printed prior to filing date.
White-Rogers, "Installation Instructions for Heating & Air Conditioning IF72 5/2 Day Programmable Heat Pump Thermostat," 8 pages, printed prior to filing date.
White-Rodgers, "Installation Instructions for Heating & Air Conditioning IF78 5/2 Day Programmable Thermostat," 7 pages, printed prior to filing date.
White-Rodgers, "Comfort-Set 90 Series Thermostat," Manual, pp. 1-24, printed prior to filing date.
White-Rodgers, "Comfort-Set III Thermostat," Manual, pp. 1-44, printed prior to filing date.
White-Rodgers, 1F80-240 "(for Heating Only systems) Programmable Electronic Digital Thermostat," Installation and Operation Instructions, 8 pages, printed prior to filing date.
White-Rodgers, 1F80-241 "Programmable Electronic Digital Thermostat," Installation and Operation Instructions, 6 pages, printed prior to filing date.
White-Rodgers, 1F80-261 "Programmable Electronic Digital Thermostat," Installation and Operation Instructions, 8 pages, printed prior to filing date.
White-Rodgers, 1F81-261 "Programmable Electronic Digital Multi-Stage Thermostat," Installation and Operation Instructions, 8 pages, printed prior to filing date.
White-Rodgers, 1F82-261 "Programmable Electronic Digital Heat Pump Thermostat," Installation and Operation Instructions, 8 pages, printed prior to filing date.
www.icmcontrols.com, Simplecomfort, SC3000 Single State Heat/ Single Stage Cool or Single Stage Heat Pump/Manual Changeover, 1 page, printed prior to filing date.
www.icmcontrols.com, Simplecomfort, SC3001 Single Stage Heat/ Single Stage Cool or Single Stage Heat Pump/Manual Changeover, 1 page, printed prior to filing date.
www.icmcontrols.com, Simplecomfort, SC3006 Single Stage Heat/ Single Stage Cool or Single Stage Heat Pump/Manual Changeover, 1 page, printed prior to filing date.
www.icmcontrols.com, Simplecomfort, SC3201 2 Stage Heat Pump Manual Changeover, 1 page, printed prior to filing date.
www.icmcontrols.com, Simplecomfort, SC3801 2 Stage Heat/2 Stage Cool 2 Stage Heat Pump/Audio Changeover, 1 page, printed prior to filing date.
Prolifix Inc., "Web Enabled IP Thermostats," 2 pages, prior to filing date of present application.
ADT Security Systems, "iCenter Advanced User Interface 8142ADT User Guide," pp. 1-136, 2001.
DeKoven et al., "Measuring Task Models in Designing Intelligent Products," pp. 188-189, 2002.
http://www.hometoys.com/htinews/apr99/releases/ha101.htm, HTI News Release, pp. 1-3, printed Oct. 28, 2004.
U.S. Appl. No. 10/440,474, filed May 15, 2003, entitled "Reverse Images in a Dot Matrix LCD for an Environmental Control Device.".
U.S. Appl. No. 10/654,230, filed Sep. 3, 2003, entitled "Programmable Thermostat Incorporating a Liquid Crystal Display and Having a Feature for Mounting Horizontally, Vertically and any Intermediate Orientation".
U.S. Appl. No. 10/654,235, filed Sep. 3, 2003, entitled "Programmable Thermostat Incorporating a Liquid Crystal Display Selectively Presenting Adaptable System Menus Including Changeable Interactive Vitual Buttons.".

* cited by examiner

CONTROLLER INTERFACE WITH DYNAMIC SCHEDULE DISPLAY

FIELD OF THE INVENTION

The present invention relates generally to the field of programmable controllers for devices. More specifically, the present invention pertains to simplified interfaces for device controllers having a dynamic schedule display.

BACKGROUND OF THE INVENTION

Controllers are used on a wide variety of devices and systems. Some controllers have schedule programming that modifies schedule parameters such as set points as a function of date and/or time. Some device or system controllers that utilize schedule programming include, for example, HVAC controllers, security system controllers, lawn sprinkler controllers, and lighting system controllers.

In one example, HVAC controllers are often employed in monitoring and, if necessary, controlling various environmental conditions within a home, office or other enclosed space. Such devices are useful, for example, in regulating the temperature, humidity, venting, air quality, etc., within a particular space. The controller may include a microprocessor that interacts with other components in the HVAC system. For example, in many modem thermostats for use in the home or office setting, a controller unit may be provided to interact with a heater, blower, flue vent, air compressor, humidifier and/or other components, to control the temperature, humidity or other environmental conditions at various locations within the home or office. One or more sensors located within the controller unit and/or one or more remote sensors may be employed to sense when the temperature and/or humidity (or other environmental conditions) reaches a certain threshold level, causing the controller unit to send a signal to activate or deactivate one or more component in the system.

The controller may be equipped with an interface that allows the user to monitor and adjust the environmental conditions at one or more locations within the building. With more modem designs, the interface typically includes a liquid crystal display (LCD) panel inset within a housing that contains a microprocessor as well as other components of the controller. In some designs, the interface may permit the user to program the controller to activate on a certain schedule determined by the user. For example, the interface may include a menu routine that permits the user to change the temperature at one or more times during a particular day. Once the settings for that day have been programmed, the user can repeat the process to change the settings for the other remaining days.

In some cases, the interface is simply too complex or cumbersome to be conveniently used to inform the user of where the schedule is in relation to the current time and is simply by-passed or programmed by the user to a temperature set point beyond the desired value in an attempt to achieve a desired temperature quickly. Accordingly, there is an ongoing need in the art to improve the ease of use and understanding of the current schedule in a programmable controller.

SUMMARY OF THE INVENTION

Generally, the present invention pertains to simplified interfaces for controllers having a dynamic schedule display.

In one illustrative embodiment, a controller includes a programmable schedule and a user interface, adapted and configured to illustratively display at least a portion of the programmable schedule along a time axis and a current time indicator positioned to indicate the current time along the time axis.

In a further illustrative embodiment, a method is described including the steps of: operating a programmable controller having a scheduled current set point and a scheduled future set point; and providing a message indicating a time of the scheduled future set point change.

In another illustrative embodiment, a method includes the steps of: operating a programmable controller to cause an HVAC system to change an environmental condition of an inside space from a first initial set point to a second desired set point, the HVAC system achieving the change in the environmental condition to the second desired set point in an amount of time; and providing a message during the amount of time indicating when the desired second set point is anticipated to be achieved in the inside space.

In another illustrative embodiment, a method includes the steps of: operating a programmable controller to cause an HVAC system to change an environmental condition of an inside space from a first initial set point to a second desired set point, the HVAC system achieving the change in the environmental condition to the second desired set point in an amount of time; allowing a user to change the second desired set point to a third over-controlling set point; and informing the user that changing the second desired set point to the third over-controlling set point will not decrease the amount of time needed to achieve the second desired set point. Controllers adapted to provide the above methods are also contemplated.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
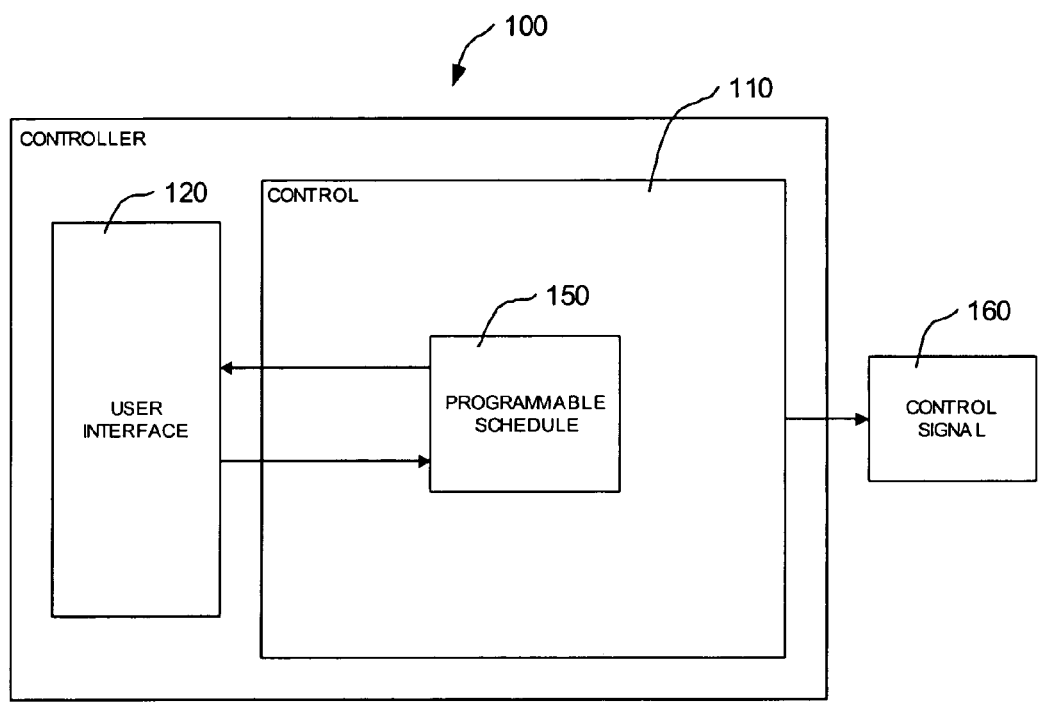
FIG. 1 is a block diagram of an illustrative controller.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Generally, the present invention pertains to simplified interfaces for controllers having schedule override programming capabilities. These controllers can be used in a variety of systems such as, for example, HVAC systems, sprinkler systems, security systems, lighting systems, and the like. The Figures depict illustrative HVAC controllers. While the present invention is not so limited, an appreciation of various aspects of the invention will be gained through a discussion of the examples provided below.

HVAC controllers can regulate environmental conditions such as, for example, temperature within an enclosed space. The controller can regulate the environmental condition as a function of time by using, for example, a programmable schedule. That is, the programmed schedule may cause the controller to activate one or more components of an HVAC system such that the desired environmental condition follows the programmed schedule.

In some cases, a user interface may include a separate menu routine that builds and/or modifies a schedule to permit the user to change the temperature at one or more times during a particular day such as, for example, a temperature setting for a "wake" time interval, a "leave" time interval, a "return" time interval and/or a "sleep" time interval. The user can program a start time and/or end time (and/or time duration) for each and a heat and/or cool temperature for each desired time interval. Once the settings for that day have been programmed, the user can often repeat the process to change the settings for the other remaining days of the week with the schedule. In some cases, the programmable controller may include a feature that allows the user to set a separate schedule for weekday and weekend use, and/or to copy the settings from a particular day to another day, as desired. Other methods for programming the schedule are also contemplated.

FIG. 1 is a block diagram of an illustrative controller 100. Controller 100 includes a control module 110 that can be a microprocessor or the like. The control module 110 can include a programmable schedule 250 as described above, for example. The control module 110 communicates with a user interface 120. The control module can also generate one or more control signals 260 to a device (not shown), such as an HVAC system or device.

In the illustrative embodiment, the user interface 120 is adapted and configured to display at least a portion of the programmable schedule 150 along a time axis. A current time indicator can be positioned to indicate the current time in relation to the time axis, and thus the schedule. The current time indicator may allow a user to easily identify the current schedule setting, the duration of the current schedule setting, the prior schedule setting and/or the next schedule setting, for example.

Figure 2:
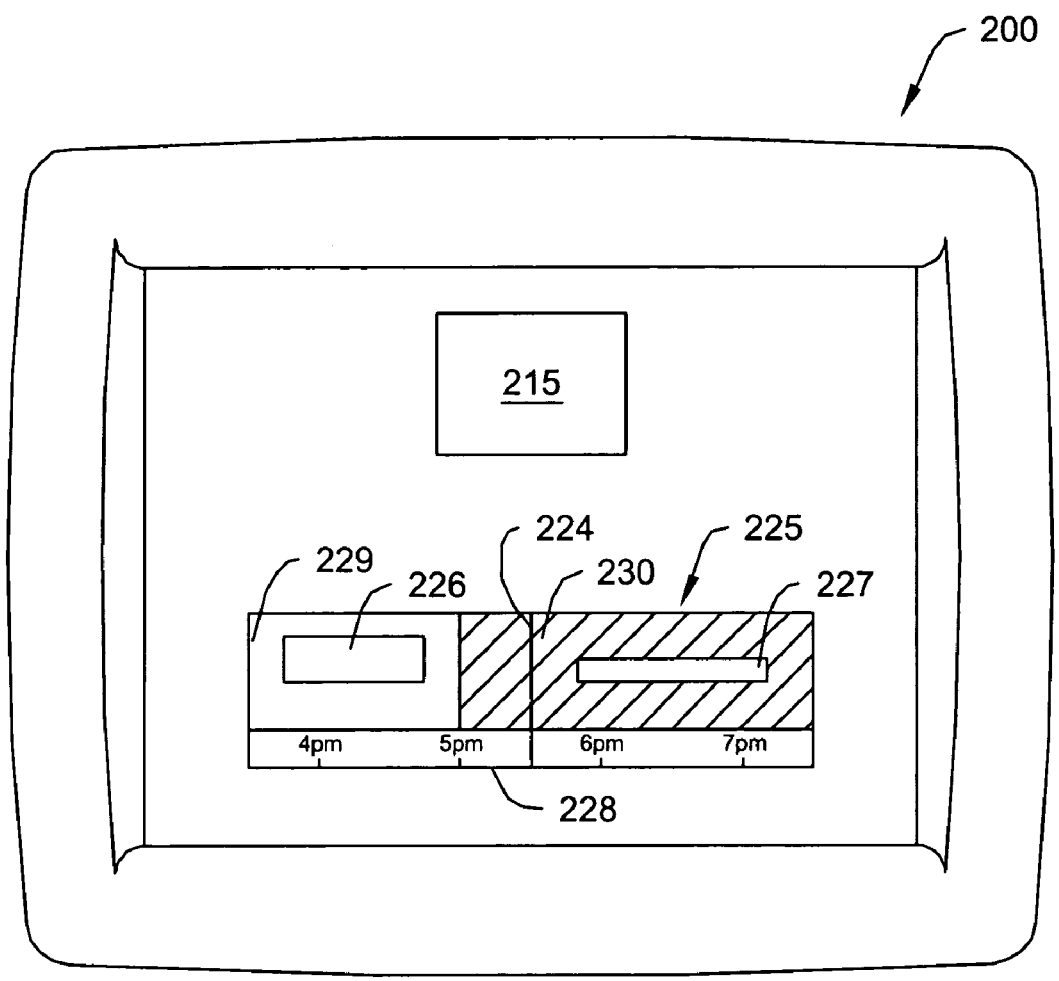
FIG. 2 is a schematic drawing of an illustrative user interface in accordance with the present invention.

FIG. 2 is a schematic drawing of an illustrative user interface 200. The user interface 200 can illustratively display at least a portion of the programmable schedule 225 along a time axis 228. A current time indicator 224 can be positioned to indicate the current time in relation to the time axis 228, and thus the schedule. This embodiment illustrates a current time indicator 224 superimposed on the time axis 228, however, this is not required in all embodiments.

This embodiment also illustrates a programmable schedule 225 displayed as a block bar graph. The block bar graph can display the programmable schedule 225 as a block bar broken into segments 229 and 230. The segments 229 and 230 can represent different schedule set points. The segments 229 and 230 can be graphically contrasting such as first segment 229 may be a lighter color or shade than the second segment 330, for example. Alternatively or in addition, each segment 229 and 230 can display a numerical or textual message 226 and/or 227, informing the user of the name of the block bar segment 229 and 230 or a particular numerical value associated with the block bar segment 229 and 230. For example, block bar segment 229 message 226 could display "Wake," "68°" or "Wake-68°" and block bar segment 230 message 227 could display "Leave," "72°", or "Leave-72°."

In some cases, any portion of the programmable schedule 225 may be displayed on the user interface 200. The illustrative embodiment of FIG. 2 shows an approximate 4 hour time window, however any length of time can be displayed such as, for example, 24 hour or more, 12 hour, 8 hour, 4 hour, 2 hour or less, as desired. The programmable schedule 225 may move or scroll in relation to the current time indicator 224. Alternatively, the current time indicator 224 may move or scroll in relation to the programmable schedule 225.

Additional information may be displayed on the user interface 200 at, for example block 215. This additional information may include a current scheduled parameter setting (e.g., temperature, humidity), a current parameter reading, and/or any other information as desired.

Figure 3:
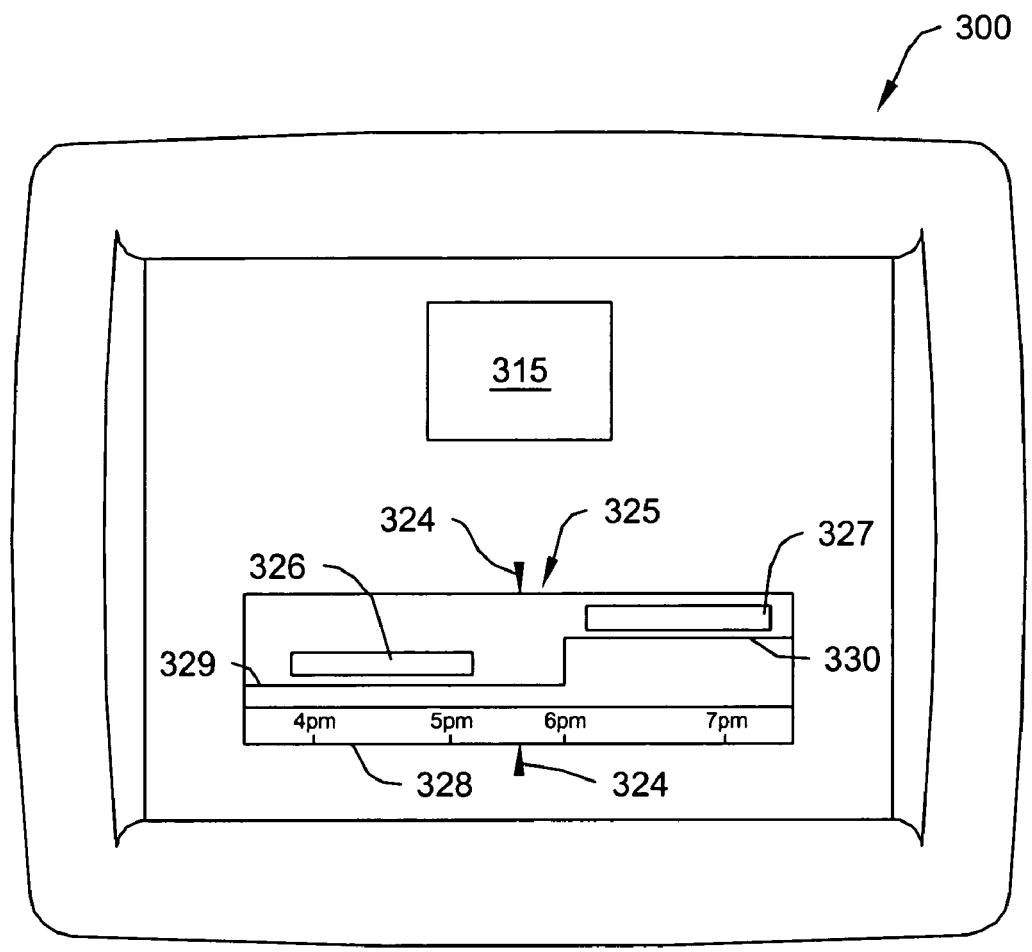
FIG. 3 is a schematic drawing of another illustrative user interface in accordance with the present invention.

FIG. 3 is another illustrative user interface 300 in accordance with the present invention. Like above, the user interface 300 can illustratively display at least a portion of the programmable schedule 325 along a time axis 328. A current time indicator 324 can be positioned to indicate the current time in relation to the time axis 328, and thus the schedule. This embodiment illustrates a current time indicator 324 positioned below the time axis 228 and a current time indicator 324 above the programmable schedule 325.

This embodiment also illustrates a programmable schedule 325 displayed as a line graph. The line graph can display the programmable schedule 325 as step segments 329 and 330. The segments 329 and 330 can represent different schedule set points. The step segments 329 and 330 can be graphically contrasting such as first line segment 329 may be a lighter color or shade than the second line segment 330, for example. Alternatively or in addition, each segment 329 and 330 can display a numerical or textual message 326 and/or 327, informing the user of the name of the step segment 329 and 330 or a particular numerical value associated with the step segment 329 and 330. For example, step segment 229 message 226 may display "Wake," "68°", or "Wake-68°" and step segment 230 message 227 could display "Leave," "72°", or "Leave-72°."

In some cases, any portion of the programmable schedule 325 may be displayed on the user interface 300. The illustrative embodiment shows an approximate 4 hour time window, however any length of time can be displayed such as, for example, 24 hour or more, 12 hour, 8 hour, 4 hour, 2 hour or less. The programmable schedule 325 may move or scroll in relation to the current time indicator 324. Alternatively, the current time indicator 324 may move or scroll in relation to the programmable schedule 325.

Additional information could be displayed on the user interface 300 at, for example block 315. This additional information may include a current scheduled parameter setting (e.g., temperature, humidity), a current parameter reading, and/or other information as desired.

Figure 4:
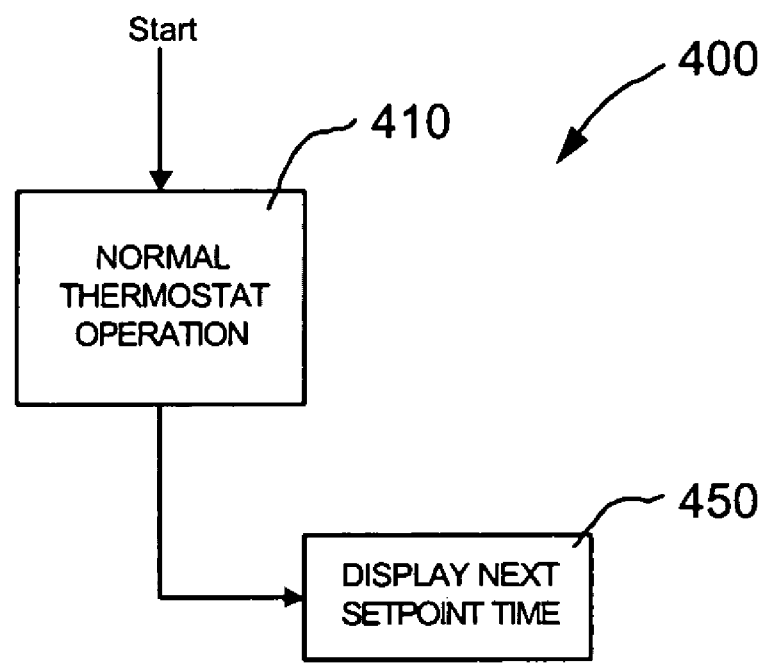
FIG. 4 is a flow diagram of an illustrative controller program.

FIG. 4 is a flow diagram of an illustrative controller program 400. The program starts at a normal thermostat operation block 410, although this is not required in all embodiments. In the illustrative embodiment, when operating in normal thermostat operation block 410, a programmed thermostat schedule may be followed to regulate one or more environmental conditions of an inside space. The programmed schedule can activate the controller to send one or more control signals to HVAC equipment on a certain schedule having at least a current set point and a future set point, as described above.

In the illustrative embodiment, a message 450 is provided via the user interface indicating a time of a scheduled next future set point change. The message 450 can be graphical, textual, aural or any other suitable message. The message 450 may provide a time of day and/or duration of time until the controller changes set points or the inside space environmental condition changes to the desired set point. Alternatively or in addition, the message 450 may provided a name or title of the current and/or next set point interval, such as, for example, "Wake," "Leave," "Return," and/or "Sleep", as described above. Alternatively or in addition, the message 450 may provide the next set point value and/or that the inside room environmental condition will be increasing or decreasing to a desired next set point such as displaying that the inside space will be cooling or heating to a desired set point in a predicted or anticipated amount of time.

The message 450 may be displayed continuously, or at a predetermined time before a next scheduled future set point change occurs. For example, the message 450 can be displayed 12 hours, 8 hours, 4 hours, 2 hours, 1 hour, 30 minutes or less before a next scheduled future set point change occurs. The message 450 may also be displayed during an amount of time that an inside space is ramping from a first set point to a next scheduled set point.

In some cases, a user may try to over-control the controller by entering an over-controlling set point in an attempt to increase the rate of temperature change and/or decrease the amount of time required to change the temperature in an inside space. However, if the HVAC device is a simple on/off device, as is typically the case, the over-controlling set point does not affect the rate of temperature change from a first set point to a desired second set point. Thus, the message 450 can be adapted to inform the user that entering an over-controlling set point will not increase the rate of temperature change and/or decrease the amount of time required to change the temperature of the inside space. In some embodiments, the message 450 can continue to inform the user of the time and/or duration of time until the inside space reaches the next scheduled set point value, even if the user modifies the current temperature setting.

Figure 5:
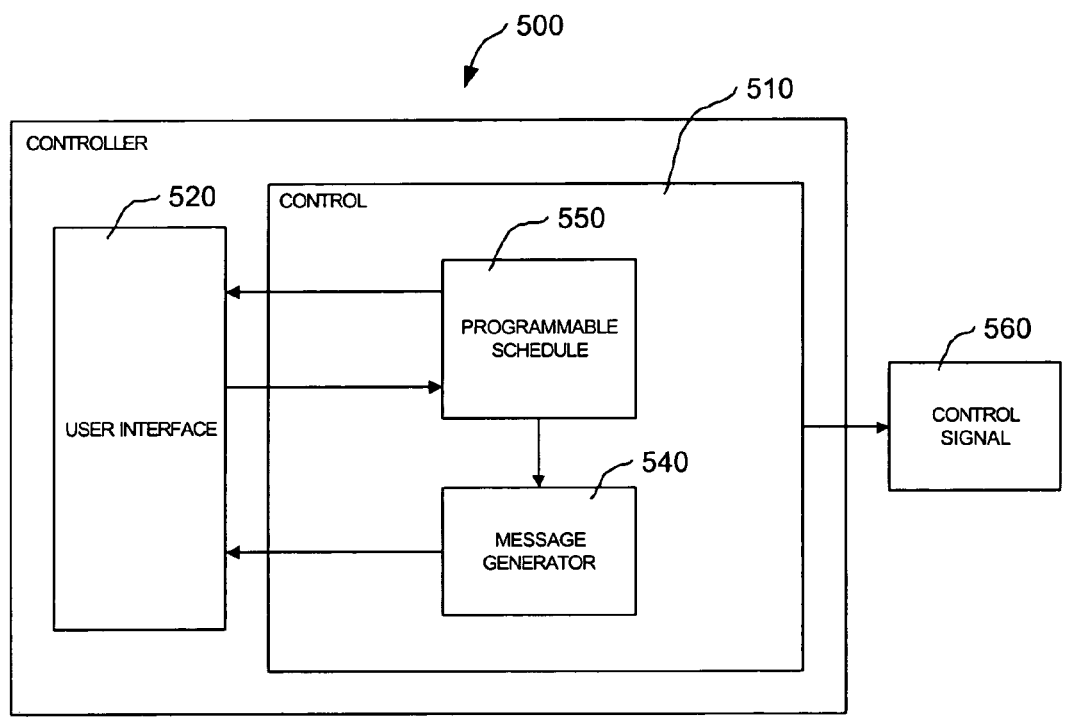
FIG. 5 is a block diagram of the illustrative controller program shown in FIG. 4.

FIG. 5 is a block diagram of the illustrative controller program shown in FIG. 4. In the illustrative embodiment, a controller 500 includes a control module 510 than can be a microprocessor or the like. The control module 510 can include a programmable schedule 550 as described above, for example. The control module 510 communicates with a user interface 520 and a message generator 540. The control module can also generate one or more control signals 560 to a device (not shown), such as an HVAC system or device.

The message generator 540 provides a message to the user interface 520 indicating when the next set point is scheduled to occur, as described above.

Figure 6:
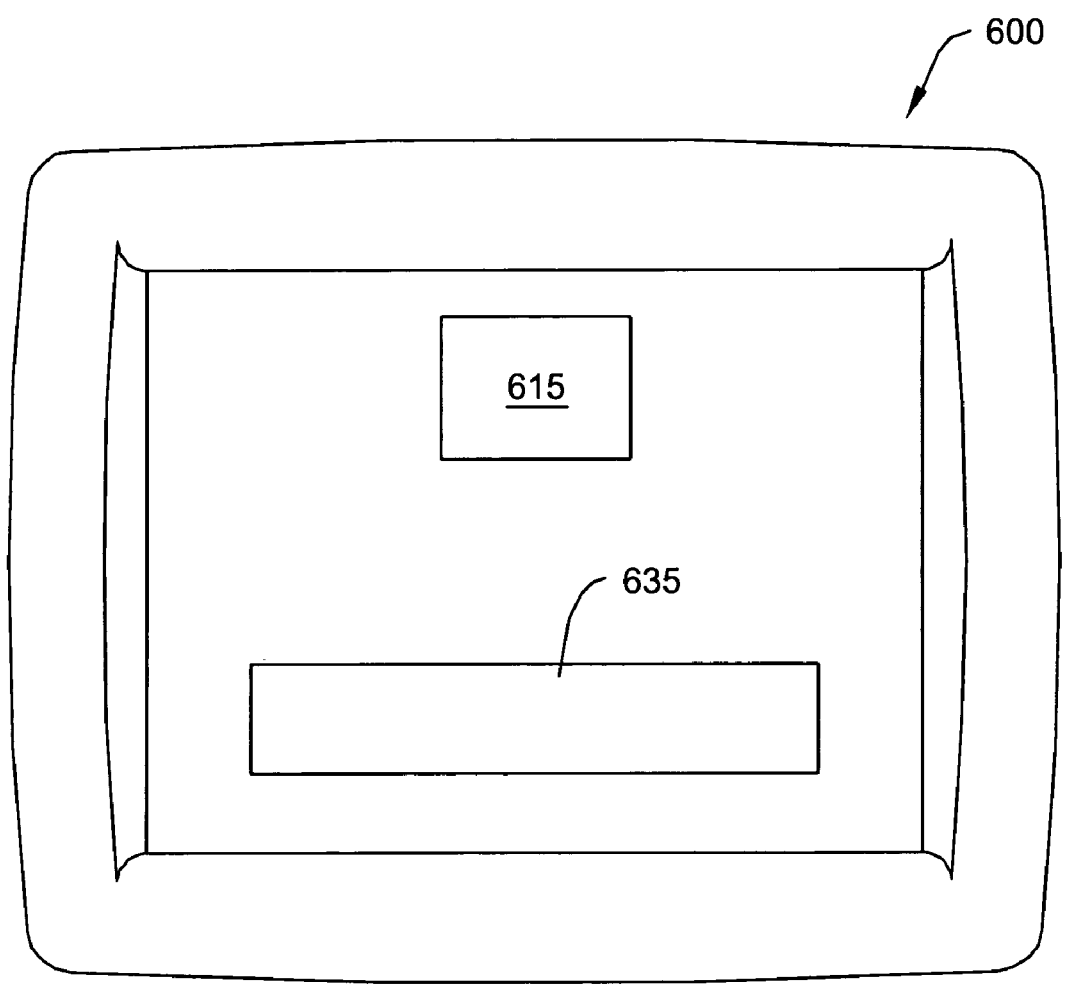
FIG. 6 is a schematic drawing of another illustrative user interface in accordance with the present invention.

FIG. 6 is a schematic drawing of an illustrative user interface 600 in accordance with the present invention. In the illustrative embodiment, the user interface 600 can display a message at block 635 on the user interface 600 indicating when the next set point change is scheduled to occur, as described above. For example, the message displayed at block 635 can be "Cooling in 10 min," "65° F. in 10 min," "Cooling to 65° F. in 10 min," "Heating in 5 min" "70° in 5 min," "Heating to 70° in 5 min," and the like.

Additional information could be displayed on the user interface 600 at, for example block 615. This additional information may include a current scheduled parameter setting (e.g., temperature, humidity), a current parameter reading, and/or other information as desired.

The present invention should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A method comprising the steps of:
   operating a programmable controller to cause an HVAC system to change an environmental condition of an inside space from a first initial set point to a second desired set point, the HVAC system achieving the change in the environmental condition to the second desired set point in an amount of time; and
   providing a message during the amount of time indicating when the desired second set point is anticipated to be achieved in the inside space.

2. The method according to claim 1, further comprising entering a third over-controlling set point and still providing a message during the amount of time indicating when the desired second set point is anticipated to be achieved in the inside space.

3. The method according to claim 1, wherein the providing a message comprises providing a message of a duration of time until the desired second set point is anticipated to be achieved in the inside space.

4. The method according to claim 1, wherein the providing a message comprises providing a message of a time of day when the desired second set point is anticipated to be achieved in the inside space.

5. The method according to claim 1, wherein the providing a message comprises providing a message of when the desired second set point is anticipated to be achieved in the inside space and what the desired second set point is.

6. A controller comprising:
   a programmable controller arranged and configured to cause an HVAC system to change an environmental condition of an inside space from a first initial set point to a second desired set point, the HVAC system achieving the change in the environmental condition to the second desired set point in an amount of time; and
   a message displayed during the amount of time indicating when the desired second set point is anticipated to be achieved in the inside space.

7. A method comprising the steps of:
   operating a programmable controller to cause an HVAC system to change an environmental condition of an inside space from a first initial set point to a second desired set point, the HVAC system achieving the change in the environmental condition to the second desired set point in an amount of time;

allowing a user to change the set point to a third over-controlling set point during the amount of time; and informing the user that changing the set point to the third over-controlling set point will not decrease the amount of time needed to achieve the second desired set point.

8. A method comprising the steps of:

operating a programmable controller to cause an HVAC system to change an environmental condition of an inside space from a first initial set point to a second desired set point; and selectively displaying a message when the HVAC system is attempting to change the environmental condition of an inside space from the first initial set point to the second desired set point, the message indicating when the second desired set point is anticipated to be achieved in the inside space.

* * * * *